(12) United States Patent
Hayashi et al.

(10) Patent No.: US 6,510,130 B2
(45) Date of Patent: Jan. 21, 2003

(54) OPTICAL RECORDING MEDIUM

(75) Inventors: Hideki Hayashi, Tsurugashima (JP);
Toshio Goto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/940,693

(22) Filed: Aug. 29, 2001

(65) Prior Publication Data

US 2002/0027868 A1 Mar. 7, 2002

(30) Foreign Application Priority Data

Sep. 4, 2000 (JP) .................................... 2000-267152

(51) Int. Cl.$^7$ ................................................. G11B 7/00
(52) U.S. Cl. .............................. 369/275.4; 369/275.3
(58) Field of Search ............................ 369/275.3, 275.4

(56) References Cited

U.S. PATENT DOCUMENTS 5,808,988 A * 9/1998 Maeda et al. ......... 369/275.3 X
5,959,943 A * 9/1999 Yonezawa et al. ......... 369/13.35
6,438,098 B1 * 8/2002 Nakajima et al. ......... 369/275.4

* cited by examiner

Primary Examiner—Aristotelis M. Psitos
(74) Attorney, Agent, or Firm—Morgan, Lewis & Bockius LLP (57) ABSTRACT

An optical recording medium that enables a recording or reproduction apparatus to perform accurate tracking servo control even if intersymbol interference occurs. An optical recording medium includes a plurality of frames continuously extending in an information reading direction. Each frame is defined by a servo region for recording tracking pits used in tracking servo control and a data region for recording information data. A position of each of the respective tracking pits in each respective servo region is changed in the information reading direction between successive frames.

6 Claims, 10 Drawing Sheets

OPTICAL RECORDING MEDIUM

BACKGROUND OF THE INVENTION

1. Field of the Invention

The present invention relates to an optical recording (storage) medium and particularly to an optical recording medium operated under a sampled servo scheme.

2. Description of Related Art

An optical disc of so-called MASS (Multiplexed Address Sampled Servo) format is known as an optical recording medium suited for a sampled servo scheme.

Figure 1:
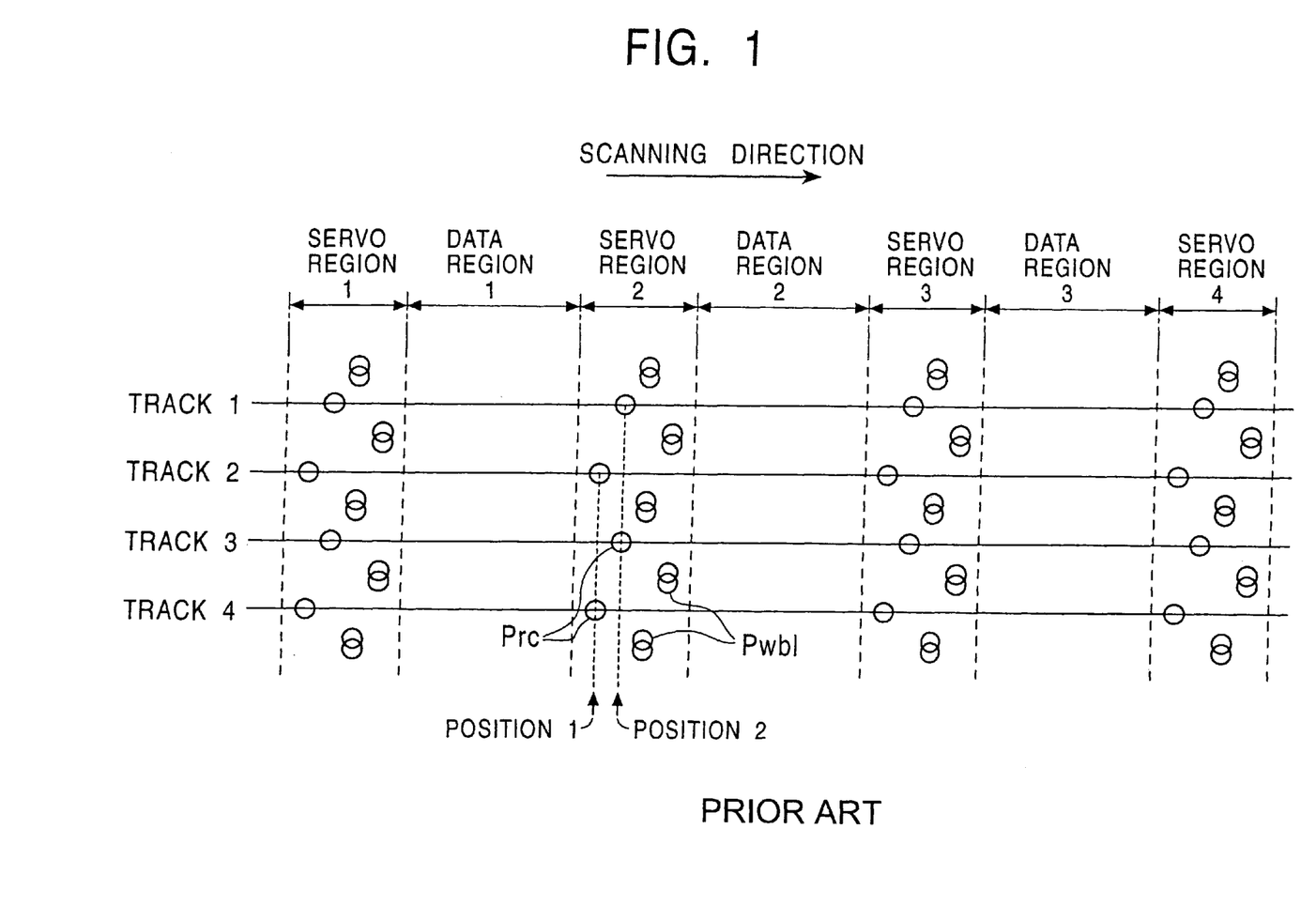
FIG. 1 illustrates a configuration of the recording surface of the conventional optical disc that operates under the sampled servo scheme.

FIG. 1 of the accompanying drawings illustrates a format of a conventional optical disc of MASS format.

In this drawing, servo regions having various kinds of pits formed therein, which are used by a reproduction apparatus when performing servo control, and data regions for recording digital data are alternately provided on respective recording tracks. The servo and data regions are aligned in a radial direction of the disc. For the sake of simplification, radial cosine pits Prc and wobble pits Pwbl (will be described below) are only indicated in the servo regions in FIG. 1.

As illustrated in FIG. 1, a single radial cosine pit Prc is formed on each recording track in each servo region, and takes one of two different positions in the information scanning (reading) direction. Two wobble pits Pwbl are formed for each recording track in each servo region such that they are spaced from the associated recording track in the disc radial direction. Specifically, one wobble pit Pwbl is spaced upwards from the recording track by a predetermined distance and the other wobble pit Pwbl is spaced downwards from the same recording track at the same distance.

The pit pattern of the radial cosine pits Prc and wobble pits Pwbl does not change on the same track, but differs from the pit pattern on a next track spaced in the radial direction of the optical disc. That is, as shown in FIG. 1, the radial cosine pits Prc are positioned relatively to the right (Position 2) on Recording Tracks 1 and 3, the left wobble pits Pwbl of Recording Tracks 1 and 3 are spaced upwards from Recording Tracks 1 and 3 and the right wobble pits Pwbl are spaced downwards from Recording Tracks 1 and 3. On the other hand, the radial cosine pits Prc are positioned relatively to the left on Recording Tracks 2 and 4, the left wobble pits Pwbl of Recording Tracks 2 and 4 are spaced downwards from Recording tracks 2 and 4 and the right wobble pits Pwbl are spaced upwards from Recording tracks 2 and 4. The wobble pits Pwbl of neighboring recording tracks on the optical disc of MASS format overlap each other as illustrated in FIG. 1.

Figure 2:
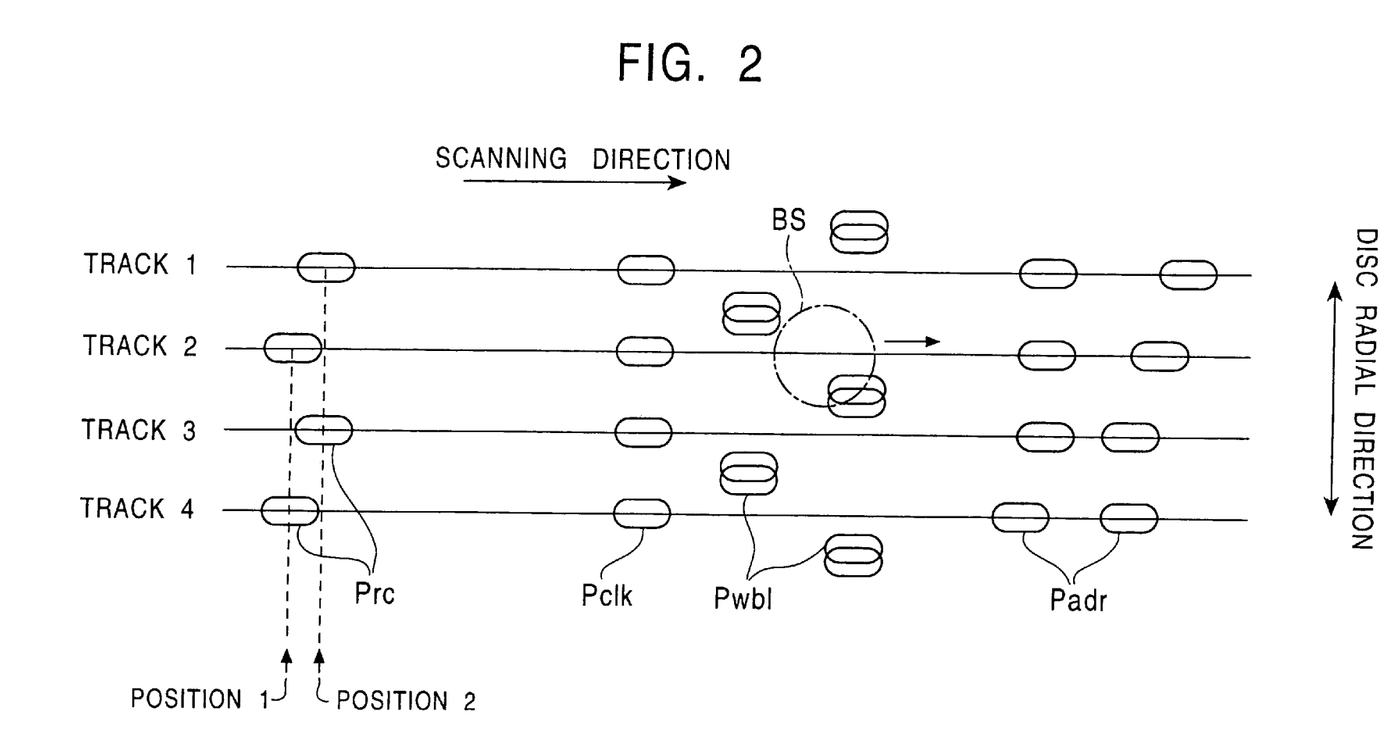
FIG. 2 illustrates an arrangement of various pits in a servo region on the optical disc shown in FIG. 1.

Referring to FIG. 2, illustrated is a detailed arrangement of the pits in the servo region.

As depicted in this drawing, the radial cosine pits Prc alternately take one of the two positions (Position 1 or 2), which are shifted from each other in the information scanning direction, on the succeeding recording tracks. By taking advantage of this position difference of the radial cosine pits, a reproduction apparatus for reproducing recorded information determines whether the recorded information is now being read from an odd number recording track or an even number recording track. Clock pits Pclk are aligned in the disc radial direction and serve as references for the reproduction apparatus when performing clock retrieval. A mirror portion between the radial cosine pit Prc and clock pit Pclk is used as a synchronization reference for the reproduction apparatus. The wobble pits Pwbl are spaced from the associated recording track upwards and downwards, and serve as references for the reproduction apparatus when performing the tracking servo control. A pair of address pits Padr are formed on each recording track in each servo region, and have a pit pattern that changes in a sixteen-recording-track cycle.

A scanning (reading) laser beam radiated from a pickup installed in the reproduction apparatus creates a beam spot BS on the recording surface of the optical disc. As the optical disc rotates, the beam spot BS traces the recording track indicated by the solid line in a direction indicated by the arrow in FIG. 2. The pickup receives a reflected light of the beam spot BS from the recording surface and obtains a scanned (read) signal in accordance to an amount of the reflected light. During this operation, the tracking servo is conducted such that the beam spot BS accurately traces the recording track. To this end, the beam spot BS is required to trace the recording track that extends on the center line between a pair of wobble pits Pwbl. The tracking servo is therefore performed in such a way that the scanned signals resulting from the two wobble pits Pwbl have the same level. It should be noted, however, that as shown in FIG. 2 the pit pattern of a pair of wobble pits Pwbl alternately changes with the recording track so that the reproduction apparatus utilizes the radial cosine pits Prc to determine which recording track is now being read, and alternately reverses polarity of a tracking error signal. By doing so, the beam spot BS can accurately trace the recording tracks.

If the pit length and pit interval are reduced to raise recording density of the optical disc, if a focus servo is inaccurate or if the disc becomes deformed and tilted, then adjacent pits on the same recording track influence each other and waveforms of read signals become distorted. This is called intersymbol interference. Variations of the waveforms caused by the intersymbol interference depend upon the pit pattern defined by adjacent pits on the same recording track. The reproduction apparatus detects from the waveform of the read signal a servo error signal in the servo loop such as the tracking servo loop or PLL (Phase Locked Loop) for clock retrieval. If the above mentioned intersymbol interference occurs, the level of the servo error signal also changes since the waveform of the read signal changes.

In the optical disc operated under the conventional sampled servo scheme, the pit pattern does not change in the respective servo regions along the same recording track. Therefore, even if the intersymbol interference occurs, the level of the servo error signal does not change for the same recording track, and disturbance of low frequency is added to the servo loop of the reproduction apparatus. In such a case, the servo loop (servo control) follows the low frequency disturbance so that the servo control becomes inaccurate.

OBJECTS AND SUMMARY OF THE INVENTION

The present invention intends to overcome the above described problems, and its primary object is to provide an optical recording medium that enables a reproduction apparatus to accurately perform tracking servo even if intersymbol interference occurs.

According to one aspect of the present invention, there is provided an optical recording medium comprising a plurality of frames continuously extending in an information reading direction, each frame being defined by a servo region in which tracking pits are formed for tracking servo control and a data region for recording information data, wherein a position of each of the respective tracking pits in each respective servo region is changed in the information reading direction between successive frames.

DETAILED DESCRIPTION OF THE INVENTION

Figure 3:
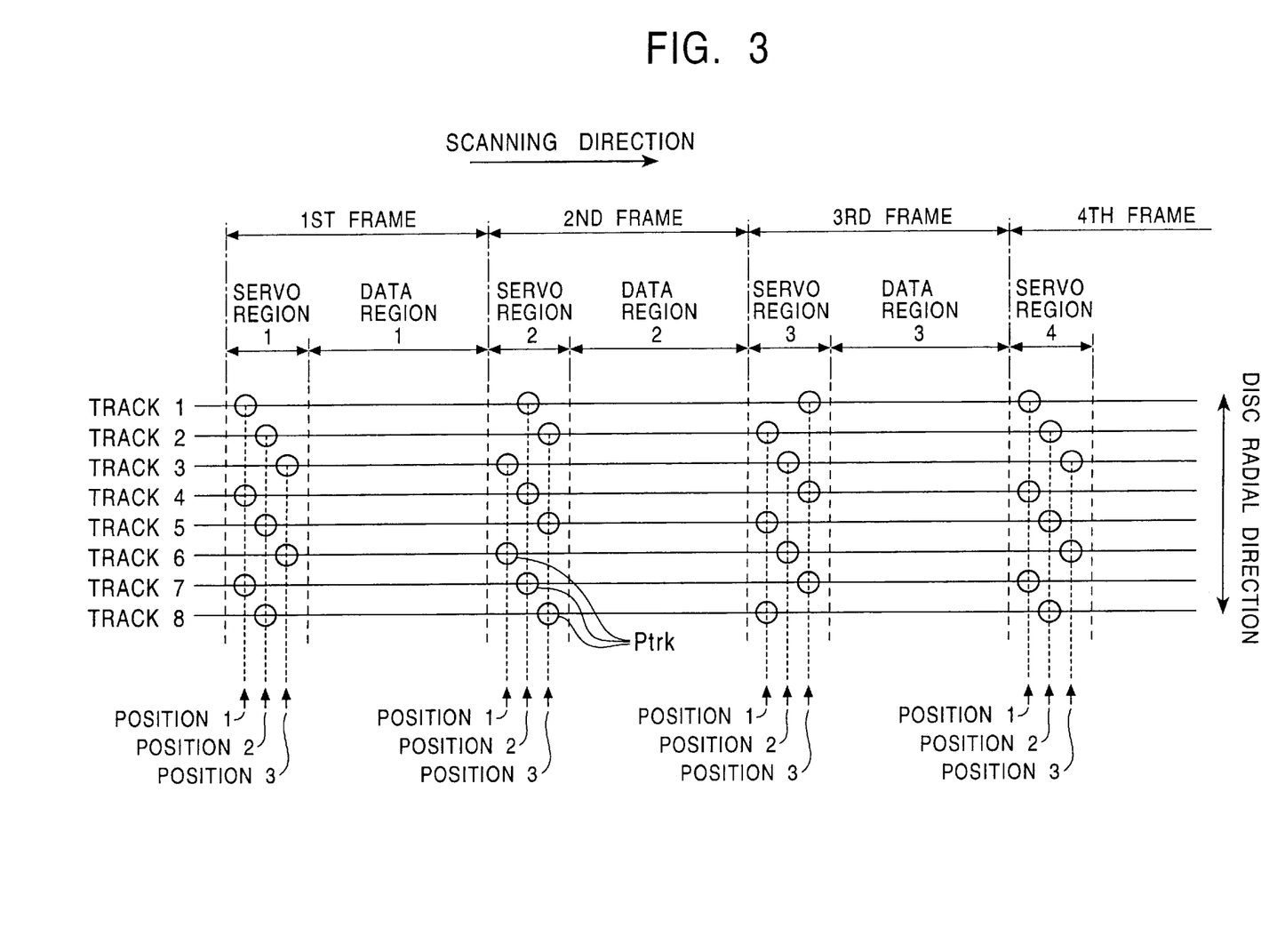
FIG. 3 illustrates a configuration of a recording surface on an optical disc according to the present invention.

Referring to FIG. 3, illustrated is a structure of a recording surface on an optical disc, which is an example of the optical recording medium of the present invention.

As shown in this drawing, servo regions in which various kinds of pits are formed as servo references for a reproduction apparatus, and data regions in which information data is recorded are alternately formed on the recording surface of the optical disc. The servo regions and data regions are aligned in the disc radial direction respectively. A frame is defined by a pair of servo and data regions successively present on the same recording track.

It should be noted that tracking pits are only indicated in the servo regions in FIG. 3, and data pits for the information data to be formed in the data regions are omitted. It should also be noted that although a plurality of recording tracks (Tracks 1 to 8) are shown in FIG. 3, these recording tracks define in fact a single continuous recording track when the optical disc has a spiral track structure.

In FIG. 3, one tracking pit Ptrk is formed on each recording track in each servo region and takes one of three different positions in the information scanning direction. For description purpose, these positions of the tracking pits Ptrk are referred to as Position 1, Position 2 and Position 3 from the left in FIG. 3.

The positions of the tracking pits Ptrk sequentially change on the same recording track between successive frames. For instance, the tracking pits Ptrk formed on Recording Track 1 are located at Position 1 in Servo Region 1 of the first frame, at Position 2 in Servo Region 2 of the second frame, and at Position 3 in Servo Region 3 of the third frame. This pattern of arrangement for the tracking pits Ptrk in the three continuous frames is repeated in the next three frames.

The tracking pits Ptrk on adjacent recording tracks take different positions in the same servo region. In the configuration shown in FIG. 3, the tracking pits Ptrk can take three positions, namely Positions 1, 2 and 3. For example, the tracking pits Ptrk in Servo Region 1 are located at Position 1 on Recording Track 1, at Position 2 on Recording Track 2, and at Position 3 on Recording Track 3. This pattern of arrangement for the tracking pits Ptrk in the three continuous recording tracks is repeated in the next three recording tracks.

Since the servo regions and data regions are aligned in the disc radial direction respectively, the whole cycle of the disc, i.e., the single continuous recording track on the disc, is defined by M frames (M is a positive integer). Because the tracking pits Ptrk have the above described pattern of arrangement, the tracking pits Ptrk on adjacent recording tracks have different positions. As a result, the following equation should hold true:

$$M=3k+1 \text{ (}k\text{ is a positive integer)}$$

or $$M=3k-1.$$

Figure 4:
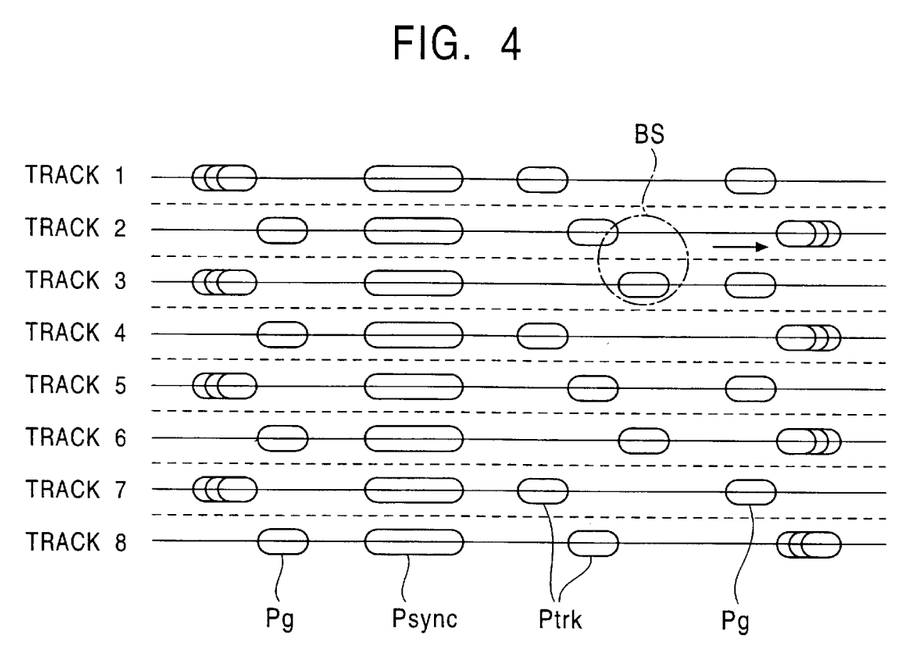
FIG. 4 illustrates an arrangement of various pits in a servo region on the optical disc shown in FIG. 3.

Referring to FIG. 4, illustrated is a detailed arrangement of the pits in the servo region.

In this drawing, a guard pit Pg, a synchronization pit Psync and a tracking pit Ptrk are formed on each of a plurality of recording tracks in the single servo region. It should be noted that a plurality of recording tracks (Tracks 1 to 8) are shown in FIG. 4, but these recording tracks define in fact a single continuous recording track when the optical disc has a spiral track configuration.

The guard pits Pg are located in the servo region near the borders of the servo region and data region to prevent the intersymbol interference between the servo region and data region. The synchronization pits Psync are aligned in the disc radial direction, elongated more than other pits, and serve as synchronization references for the reproduction apparatus. The tracking pits Ptrk take the three different positions in the information reading direction and serve as the tracking servo references for the reproduction apparatus.

A scanning laser beam radiated from a pickup installed in the reproduction apparatus creates a beam spot BS on the recording surface as shown in FIG. 4. The beam spot BS traces the center line between adjacent recording tracks indicated by the broken lines in FIG. 4 in the direction of the arrow as the disc rotates. The pickup receives a reflected light of the beam spot BS from the recording surface and obtains a scanned signal (a read signal) that corresponds to an amount of the reflected light. During this operation, the tracking servo control is carried out such that the beam spot BS accurately traces the center line between the recording tracks.

Figure 5:
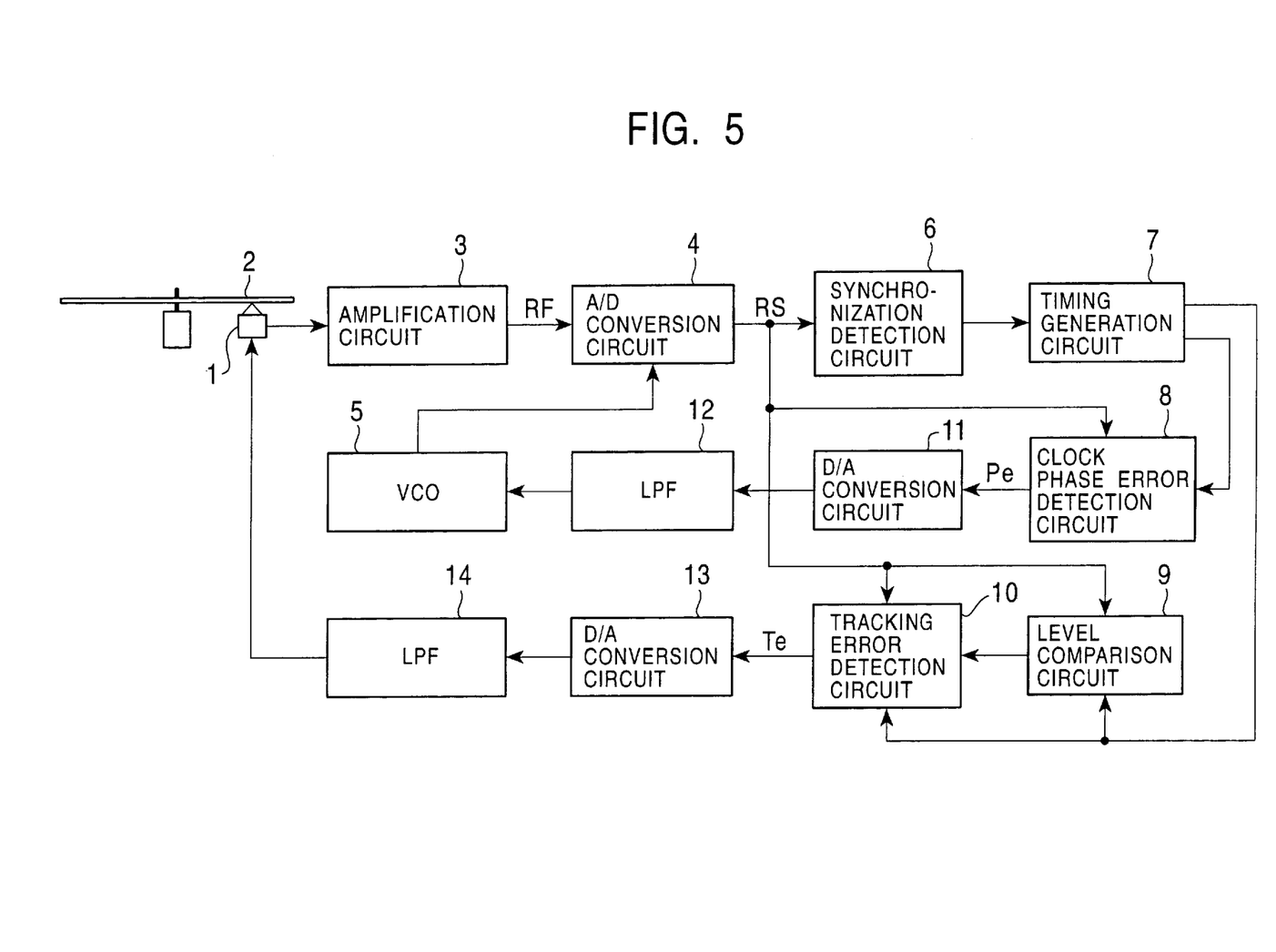
FIG. 5 illustrates a structure of an apparatus for optically reproducing recorded information from the optical disc shown in FIGS. 3 and 4.

FIG. 5 illustrates a construction of the reproduction apparatus for optically reproducing recorded information from the optical disc.

The pickup 1 radiates a scanning laser beam onto the recording surface of the optical disc 2 having the construction as shown in FIGS. 3 and 4, obtains an analog read signal resulting from photo-electro conversion of the reflected light, and supplies it to an amplification circuit 3. The amplification circuit 3 amplifies this analog signal and supplies the resulting signal RF to an A/D conversion circuit 4. The A/D conversion circuit 4 samples the analog signals RF in synchronization with reproduction clocks fed from VCO (Voltage Controlled Oscillator) 5 to obtain a series of sampled values RS. A synchronization detection circuit 6 detects a segment deriving from the synchronization pit Psync from the series of sampled values RS, and supplies an obtained synchronization detection signal to a timing generation circuit 7. The timing generation circuit 7 generates various timing signals on the basis of the synchronization detection signal as a time reference, and supplies them to a clock-phase error detection circuit 8, a level comparison circuit 9 and a tracking error detection circuit 10 respectively. The clock phase error detection circuit 8 first extracts two sampled values that are derived from both edges of the synchronization pit Psync from the series of sampled values RS in response to the timing signal. The clock phase error detection circuit 8 then calculates a level difference between these sampled values, and supplies the resultant as a phase error data Pe to the D/A conversion circuit 11. The D/A conversion circuit 11 converts the phase error data Pe into an analog phase error signal and feeds it to LPF (Low Pass Filter) 12. LPF 12 smoothes the waveform of the phase error signal and feeds the resulting signal to VCO 5. VCO 5 changes (adjusts) an oscillation frequency in response to the level of the smoothed phase error signal so as to generate a reproduction clock, which is phase synchronized with the signal RF, and supplies it to the A/D conversion circuit 4.

The A/D conversion circuit 4, clock phase error detection circuit 8, D/A conversion circuit 11, LPF 12 and VCO 5 constitute in combination a PLL (Phase Locked Loop) circuit. The PLL circuit is a servo loop that causes the reproduction clock to be phase synchronized with the analog signal RF.

The level comparison circuit 9 extracts three sampled values that are originated from the tracking pits Ptrk from the series of sampled values RS in response to the timing signal, and compares the levels of these three sampled values with each other to determine a pattern of the tracking pits Ptrk. The level comparison circuit 9 then supplies a pattern determination signal, which represents a result of the determination, to the tracking error detection circuit 10. The tracking error detection circuit 10 extracts two sampled values, which correspond to the tracking pits Ptrk, from the series of sampled values RS in response to the pattern determination signal and timing signal, and calculates and supplies a difference between the levels of these two sampled values as a tracking error data Te to the D/A conversion circuit 13. The D/A conversion circuit 13 converts the tracking error data Te into an analog tracking error signal and supplies it to LPF (Low Pass Filter) 14. LPF 14 smoothes the waveform of the tracking error signal and supplies it to the pickup 1. The pickup 1 controls the radiation position of the beam spot BS in the disc radial direction in response to the smoothed tracking error signal.

The amplification circuit 3, A/D conversion circuit 4, tracking error detection circuit 10, D/A conversion circuit 13, LPF 14 and pickup 1 constitute in combination a tracking servo loop. The tracking servo loop is a servo loop that causes the beam spot BS to trace the center line between adjacent recording tracks.

Figure 6A:
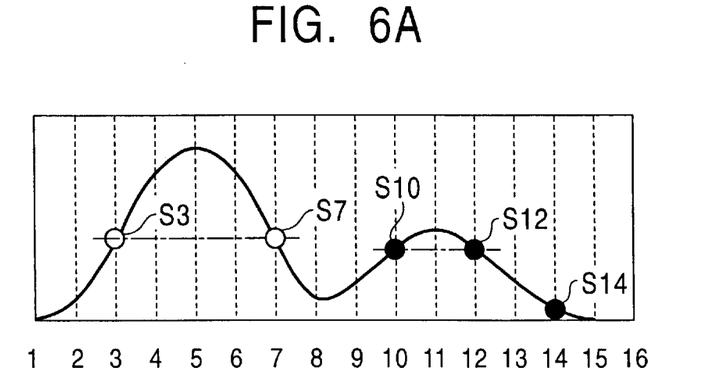
FIGS. 6A to 6C are diagrams illustrating waveforms of scanned signals (without intersymbol interference) obtained from the servo region shown in FIG. 3 by the optical reproduction apparatus shown in FIG. 5 respectively.
Figure 6B:
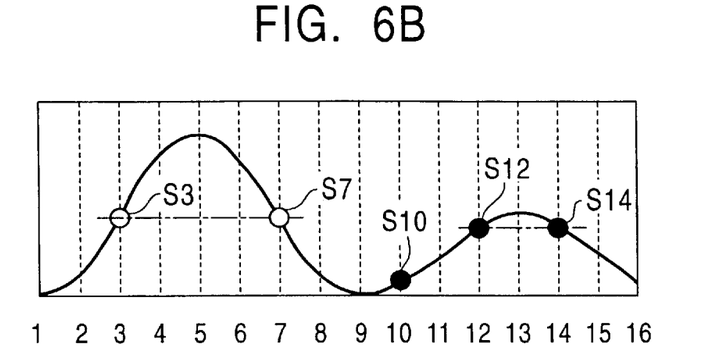
Figure 6C:
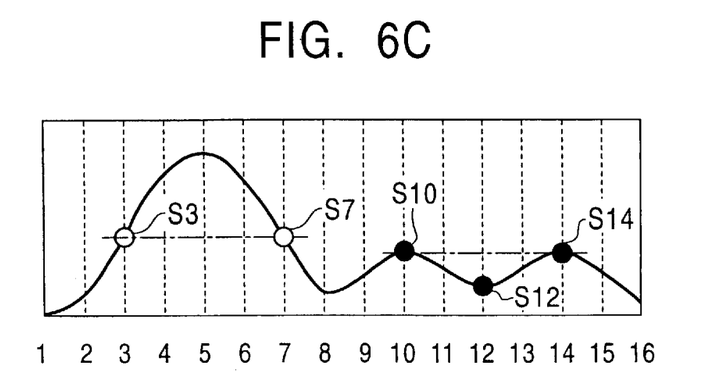

Referring to FIGS. 6A to 6C, illustrated are waveforms of read signals obtained when the optical reproduction apparatus scans the recorded information from the servo regions formed on the optical disc 2.

Specifically, FIG. 6A depicts the waveform of the read signal acquired when the beam spot BS traces the center line between Recording Tracks 1 and 2 in FIG. 4. FIG. 6B depicts the waveform of the read signal obtained when the beam spot BS traces the center line between Recording Tracks 2 and 3 in FIG. 4. FIG. 6C depicts the waveform of the read signal obtained when the beam spot BS traces the center line between Recording Tracks 3 and 4 in FIG. 4. In FIGS. 6A to 6C, the broken lines indicate the sampling timing of the A/D conversion circuit 4 in response to the reproduction clock. Sixteen sampled values S1 to S16 are acquired at the time t1 to t16 respectively.

In FIGS. 6A to 6C, the sampled values S3 and S7 indicated by the unshaded circles are sampled values that are derived from the edges of the synchronization pit Psync. The level difference between these two sampled values S3 and S7 represents the phase error of the reproduction clock.

In other words, the clock phase error detection circuit 8 obtains the phase error data Pe from the following calculation using the sampled values S3 and S7.

$$Pe = S3 - S7$$

On the other hand, the level comparison circuit 9 compares the levels of three sampled values S10, S12 and S14 indicated by the shaded circles in FIGS. 6A to 6C with each other to determine the arrangement pattern of the tracking pits Ptrk.

In the case of FIG. 6A;

$$S14 < S10 \text{ and}$$

$$S14 < S12,$$

so that the tracking pits Ptrk on the recording tracks on both sides of the beam spot BS are situated at Positions 1 and 2. It is therefore considered that the beam spot BS is now tracing between Recording Tracks 1 and 2. The level difference between the sampled values S10 and S12 that are derived from the two tracking pits Ptrk represents the tracking error of the beam spot BS. The tracking error detection circuit 10 therefore obtains the tracking error data Te from the following calculation using the sampled values S10 and S12:

$$Te = S10 - S12$$

Likewise, in the case of FIG. 6B the level comparison circuit 9 determines that $$S10 < S12 \text{ and}$$

$$S10 < S14,$$

so that the tracking error detection circuit 10 obtains a tracking error data Te from the following equation:

$$Te = S12 - S14.$$

Similarly, in the case of FIG. 6C the level comparison circuit 9 determines that $$S12 < S10 \text{ and}$$

$$S12 < S14,$$

so that the tracking error detection circuit 10 obtains a tracking error data Te from the following equation:

$$Te = S14 - S10.$$

It should be noted that FIGS. 6A to 6C show the waveforms of the read signals when there is no intersymbol interference, and the two sampled values used in the calculation of the phase error data Pe have the same level and the two sampled values used in the calculation of the tracking error data Te also have the same value, as indicated by the single-dot chain lines. In other words, the phase error data Pe is zero and the tracking error data Te is zero in the case of no intersymbol interference.

If the intersymbol interference occurs, on the other hand, the reflected lights from the synchronization pits Psync influence each other and the reflected lights from the tracking pits Ptrk influence each other so that distortions arise in the waveforms of the read signals. As a result, the two sampled values used in the calculation of the phase error data Pe do not always have the same level, and those used in the calculation of the tracking error data Te do not always have the same level.

Figure 7A:
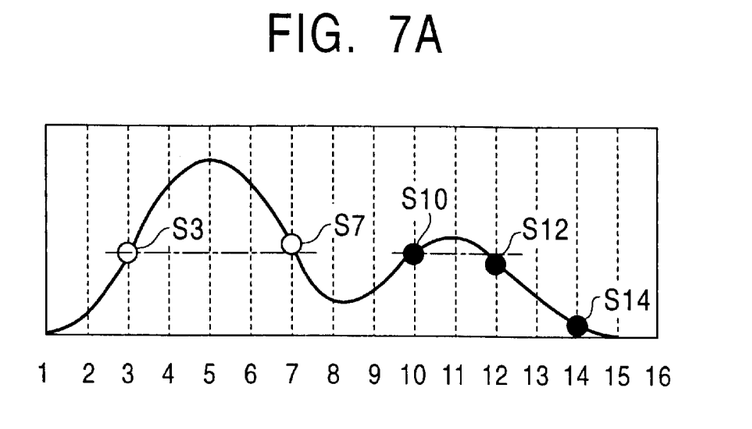
FIGS. 7A to 7C are diagrams illustrating waveforms of scanned signals (with the intersymbol interference) obtained from the servo region shown in FIG. 3 by the optical reproduction apparatus shown in FIG. 5 respectively.
Figure 7B:
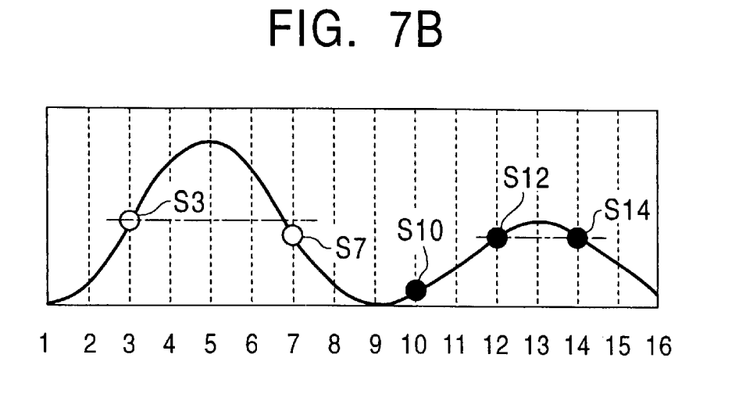
Figure 7C:
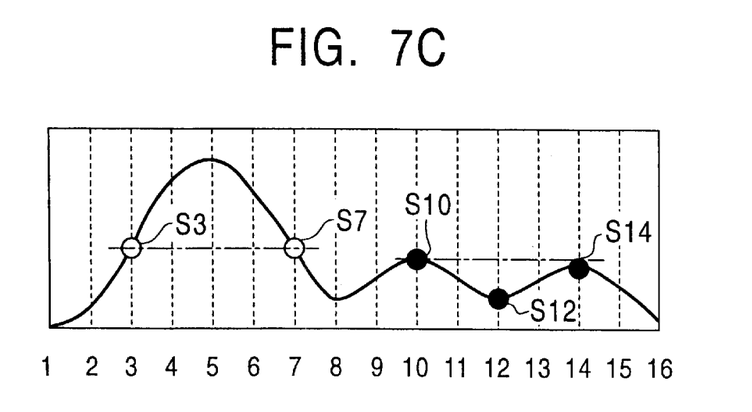

Referring now to FIGS. 7A to 7C, illustrated are examples of waveforms of scanned signals obtained when the intersymbol interference has occurred.

FIG. 7A corresponds to FIG. 6A, FIG. 7B corresponds to FIG. 6B, and FIG. 7C corresponds to FIG. 6C.

In the case of FIG. 7A, for example, the sampled value S7 is greater than the sampled value S3, and the sampled value S12 is smaller than the sampled value S10 so that the phase error data Pe and tracking error data Te are expressed as follow:

$Pe=S3-S7<0$ $Te=S10-S12>0.$

In the case of FIG. 7B, the sampled value S7 is smaller than the sampled value S3, and the sampled value S12 is equal to the sampled value S14 so that the phase error data Pe and tracking error data Te are expressed as follow:

$Pe=S3-S7>0$ $Te=S12-S14=0.$

In the case of FIG. 7C, the sampled value S7 is equal to the sampled value S3 but the sampled value S14 is smaller than the sampled value S10 so that the phase error data Pe and tracking error data Te are expressed by the follow formulas:

$Pe=S3-S7=0$ $Te=S14-S10<0.$

As understood from the above, when there is the intersymbol interference, each of the phase error data Pe and tracking error data Te can take a positive value, zero or a negative value.

Figure 8:
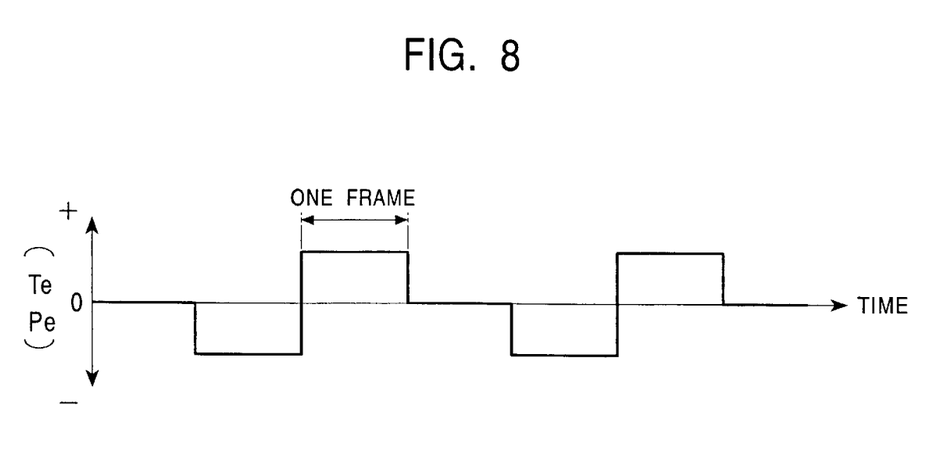
FIG. 8 illustrates a graphical example of level variations of phase error data Pe and tracking error data Te over time.

FIG. 8 illustrates an example of the changing level of the phase error data Pe or tracking error data Te over time (example of how the level of the phase error data or tracking error data Te changes as the time passes by).

In this embodiment, the arrangement pattern of the tracking pits Ptrk varies between the successive frames on the same recording track as shown in FIG. 3, and the level of the error data (Pe or Te) correspondingly changes for each of the three frames in a frame group, and these changes repeat between respective frame group as shown in FIG. 8. This level variation is added to the servo loop as disturbance caused by the intersymbol interference. In general, the frame frequency is in the tens of KHz and the frequency bandwidth of the servo loop is several KHz. The frequency of the level change of the error data (Pe or Te) shown in FIG. 8 is relatively high when compared with the frequency bandwidth of the servo loop. Such high frequency disturbance is attenuated by LPFs 12 and 14 so that the servo loop does not follow the disturbance. Specifically, the tracking servo loop does not follow the changing level of the tracking error data Te, and no tracking offset arises. Further, PLL does not follow the changing level of the phase error data Pe, and no clock phase offset arises.

As described above, since the arrangement pattern of the tracking pits Ptrk vary between each respective frame in the optical recording media of the present invention, disturbance caused by the intersymbol interference shifts towards a high frequency area. This disturbance is eliminated by LPF of the reproduction machine so that use of the optical recording media of the present invention suppresses the influence of the disturbance caused by the intersymbol interference.

Figure 9:
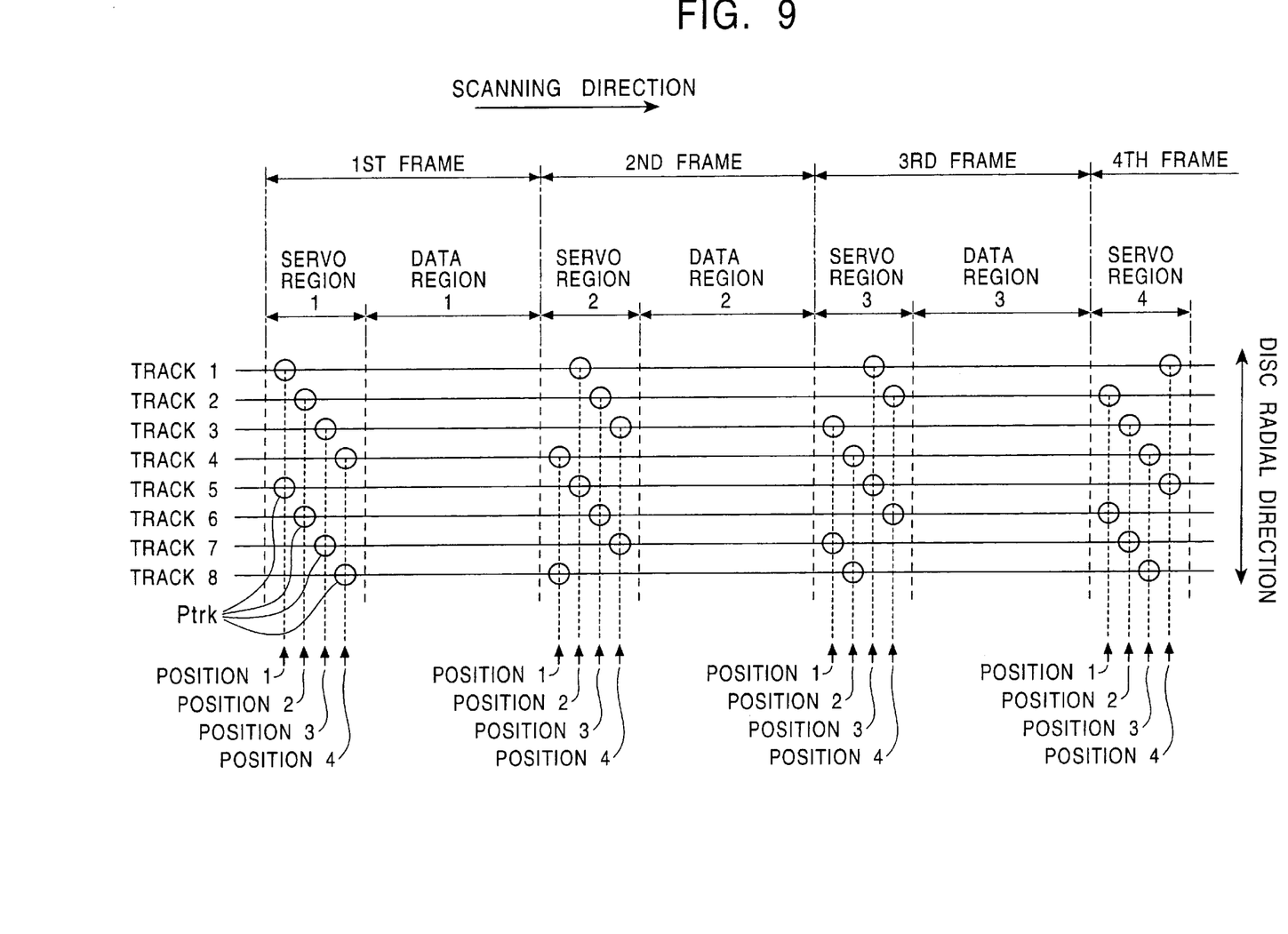
FIG. 9 illustrates a construction of a servo region on an optical disc according to another embodiment of the present invention.

It should be noted that the optical recording medium of the invention may be an optical disc having a tracking pit arrangement as shown in FIG. 9.

Referring to FIG. 9, servo regions in which various kinds of pits are formed as servo references for a reproduction apparatus, and data regions in which information data is recorded are alternately formed on the recording surface of the optical disc. The servo regions and data regions are aligned in the disc radial direction respectively. Each frame is defined by a pair of adjacent servo and data regions along the same recording track.

It should be noted that tracking pits are only indicated in the servo regions in FIG. 9, and data pits for the information data to be formed in the data regions are omitted. It should also be noted that although a plurality of recording tracks (Tracks 1 to 8) are shown in FIG. 9, these recording tracks define in fact a single continuous recording track when the optical disc has a spiral track structure.

In FIG. 9, one tracking pit Ptrk is formed on each recording track in each servo region and takes one of four different positions in the information scanning direction. For description purpose, the four positions of the tracking pits Ptrk are referred to as Position 1, Position 2, Position 3 and Position 4 from the left in FIG. 9.

The positions of the tracking pits Ptrk sequentially change along the same recording track between the successive frames. For instance, the tracking pits Ptrk formed on Recording Track 1 are located at Position 1 in Servo Region 1 of the first frame, at Position 2 in Servo Region 2 of the second frame, at Position 3 in Servo Region 3 of the third frame, and at Position 4 in Servo Region 4 of the fourth frame. This pattern of arrangement for the tracking pits Ptrk in the four continuous frames is repeated in the next four frames.

The tracking pits Ptrk on adjacent recording tracks take different positions in the same servo region. In FIG. 9, for example, the tracking pits Ptrk in Servo Region 1 are located at Position 1 on Recording Track 1, at Position 2 on Recording Track 2, at Position 3 on Recording Track 3, and at Position 4 on Recording Track 4. This pattern of arrangement for the tracking pits Ptrk in the continuous four recording tracks is repeated in the next four recording tracks.

Figure 10:
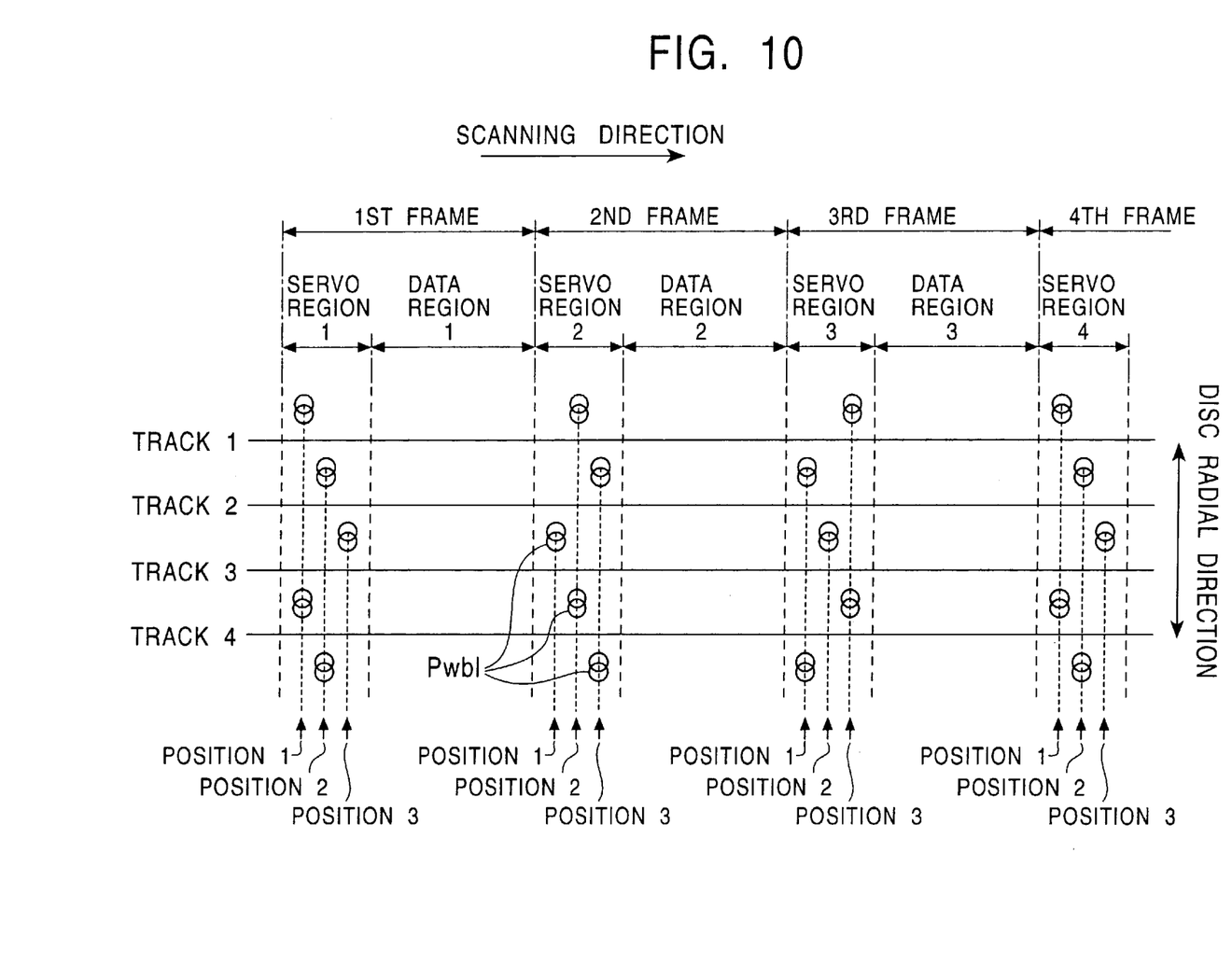
FIG. 10 illustrates a construction of a servo region on an optical disc according to still another embodiment of the present invention.

It should be noted that the optical recording medium of the invention may be an optical disc having an arrangement as shown in FIG. 10.

In the optical disc illustrated in FIG. 10, wobble pits Pwbl are employed as pits for the tracking servo control, instead of the tracking pits Ptrk.

The wobble pits Pwbl are spaced upwards and downwards from the recording tracks, and take three different positions in the information scanning direction. For description purpose, the three positions of the wobble pits Pwbl are referred to as Position 1, Position 2 and Position 3 from the left in FIG. 10. The positions of the wobble pits Pwbl sequentially change on a center line between adjacent recording tracks between successive frames. For instance, the wobble pits Pwbl formed between Recording Tracks 1 and 2 are located at Position 2 in Servo Region 1 of the first frame, at Position 3 in Servo Region 2 of the second frame, and at Position 1 in Servo Region 3 of the third frame. This pattern of arrangement for the wobble pits Pwbl in the three continuous frames is repeated in the next three frames.

The wobble pit Pwbl located between two adjacent recording tracks take a different position with respect to that between next two adjacent recording tracks in the same servo region. In FIG. 10, for example, the wobble pits Pwbl in Servo Region 1 are located at Position 2 between Recording Tracks 1 and 2, at Position 3 between Recording Tracks 2 and 3, at Position 1 on Recording Tracks 3 and 4. This pattern of arrangement for the three wobble pits Pwbl between the three continuous pairs of recording tracks is repeated for next three pairs of recording tracks.

The optical disc of the present invention is applicable to various kinds of optical disc medium.

For example, the present invention can be applied to an optical disc of read-only-type that has recorded concavo-convex pits in the data regions, an optical disc of write-once-type that allows digital data to be written in the data regions only once, and an optical disc of rewritable-type that allows digital data to be rewritten in the data regions by means of phase change recording or magneto-optical recording. In all of these cases, the tracking pits Ptrk are recorded in the form of concavo-convex pits in the servo regions.

As understood from the foregoing, the positions of the pits in the servo regions for the tracking servo control vary with the frames on the optical recording medium of the present invention.

As a result, even if the intersymbol interference occurs when the recorded information is read from this optical recording medium, the disturbance caused by the intersymbol interference has a higher frequency than a frequency range of the tracking servo loop, and therefore the tracking servo loop is not affected by the disturbance and can continuously perform the accurate servo control.

In other words, the optical recording medium of the present invention enables the reproduction machine to conduct the accurate tracking servo even if the intersymbol interference takes place.

This application is based on Japanese Patent Application No. 2000-267152 which is herein incorporated by reference.

What is claimed is:

1. An optical recording medium comprising a plurality of frames continuously extending in an information reading direction, each frame being defined by a servo region in which tracking pits are formed for tracking servo control and a data region for recording information data, wherein a position of each of the respective tracking pits in each respective servo region is changed in the information reading direction between successive frames.

2. The optical recording medium according to claim 1, wherein each tracking pit takes one of N positions in each servo region, and the tracking pits in N servo regions belonging to N continuous frames take N different positions respectively.

3. The optical recording medium according to claim 2, wherein N is three.

4. The optical recording medium according to claim 2, wherein N is four.

5. The optical recording medium according to claim 2, wherein a pattern of arrangement for the tracking pits in the N continuous frames is repeated for next N continuous frames.

6. The optical recording medium according to claim 1, wherein the tracking pits are formed on a plurality of recording tracks respectively, and the tracking pits on adjacent recording tracks have different positions in the information reading direction.

* * * * *

UNITED STATES PATENT AND TRADEMARK OFFICE
CERTIFICATE OF CORRECTION

| | | |
|---|---|---|
| PATENT NO. | : 6,510,130 B2 | Page 1 of 1 |
| APPLICATION NO. | : 09/940693 | |
| DATED | : January 21, 2003 | |
| INVENTOR(S) | : Hideki Hayashi and Toshio Goto | |

It is certified that error appears in the above-identified patent and that said Letters Patent is hereby corrected as shown below:

In the title, delete

"OPTICAL RECORDING MEDIUM"

and insert

--OPTICAL RECORDING MEDIUM IN WHICH POSITION OF TRACKING PITS IS CHANGED BETWEEN SUCCESSIVE FRAMES--

Signed and Sealed this

Third Day of October, 2006

JON W. DUDAS
*Director of the United States Patent and Trademark Office*